US012640153B2

(12) United States Patent
Horie

(10) Patent No.: US 12,640,153 B2
(45) Date of Patent: May 26, 2026

(54) INFORMATION PROCESSING APPARATUS AND INFORMATION PROCESSING METHOD

(71) Applicant: SONY GROUP CORPORATION, Tokyo (JP)

(72) Inventor: Kazuyoshi Horie, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 174 days.

(21) Appl. No.: 18/563,131

(22) PCT Filed: Jun. 11, 2021

(86) PCT No.: PCT/JP2021/022301
§ 371 (c)(1),
(2) Date: Nov. 21, 2023

(87) PCT Pub. No.: WO2022/259522
PCT Pub. Date: Dec. 15, 2022

(65) Prior Publication Data
US 2024/0274130 A1      Aug. 15, 2024

(51) Int. Cl.
*G10L 15/22* (2006.01)
*G10L 15/18* (2013.01)
*G10L 15/30* (2013.01)

(52) U.S. Cl.
CPC .......... *G10L 15/22* (2013.01); *G10L 15/1815* (2013.01); *G10L 15/30* (2013.01)

(58) Field of Classification Search
CPC ..... G10L 15/22; G10L 15/1815; G10L 15/30; G10L 2015/228; G10L 2021/105; G06F 13/00
See application file for complete search history.

(56) References Cited

U.S. PATENT DOCUMENTS

2011/0289081 A1*  11/2011  Willits .............. G06F 16/24522
                                                       707/769
2015/0074095 A1*   3/2015  Enders ................ G06F 16/2477
                                                       707/728
(Continued)

FOREIGN PATENT DOCUMENTS

JP          2015-220610 A      12/2015
JP          2019-117517 A       7/2019
(Continued)

OTHER PUBLICATIONS

International Search Report and Written Opinion of PCT Application No. PCT/JP2021/022301, issued on Aug. 31, 2021, 09 pages of ISRWO.

*Primary Examiner* — Abul K Azad
(74) *Attorney, Agent, or Firm* — CHIP LAW GROUP

(57) ABSTRACT
An information processing apparatus includes an acquisition unit that acquires a plurality of messages in response to an utterance of a speaker; a calculation unit that calculates a degree of relevance between the utterance and each of the plurality of messages; an identification unit that identifies at least one message that satisfies a predetermined criterion regarding the degree of relevance among the plurality of messages; and a presentation processing unit that performs processing related to presentation of the identified message to the speaker.

9 Claims, 12 Drawing Sheets

(56)     References Cited

U.S. PATENT DOCUMENTS

2018/0024991 A1 *   1/2018   Baldwin ............... G06F 16/335
                                                        704/9
2019/0384828 A1 *   12/2019   Bangalore Narayanamurthy .......
                                                        G06F 16/2453
2021/0350209 A1 *   11/2021   Wang ....................... G06N 3/08

FOREIGN PATENT DOCUMENTS

JP        2020-190585  A      11/2020
JP        2020-191620  A      11/2020
JP        2021-056668  A       4/2021

* cited by examiner

START

ACQUIRE SPEAKER DATA    S201

SEPARATE VOICE DATA    S202

PERFORM VOICE RECOGNITION    S203

EXECUTE INTERACTIVE PROCESSING    S204

EXECUTE AVATAR MOTION CALCULATION PROCESSING    S205

END

SPEAKER DATA

USER ID

VOICE DATA

ASSISTANT DATA

SYNTHESIZED VOICE FILE

AVATAR MOTION DATA

LIP SINK DATA

BODY MOTION DATA

⋮

SCREEN PRESENTATION COMMAND

CONVERSATION SCENARIO

| CONVER-SATION TURN | SPEAKER (DISTRIBUTOR) | AI ASSISTANT | TOPIC #1 | TOPIC #2 | ⋮ |
|---|---|---|---|---|---|
| 1 | [HELLO] | HELLO! | - | - | ⋮ |
| 2 | [HOW ARE YOU]? | I'M FINE! | - | - | ⋮ |
| 3 | I WATCHED [MOVIE] [LAST WEEKEND] | WHAT MOVIE? | 0.8647589 | 0.13524114 | ⋮ |
| 4 | IT'S POPULAR [ANIME MOVIE] | OH, THAT'S GOOD! | 0.83424604 | 0.16575399 | ⋮ |
| ⋮ | ⋮ | ⋮ | ⋮ | ⋮ | ⋮ |

FIG.11

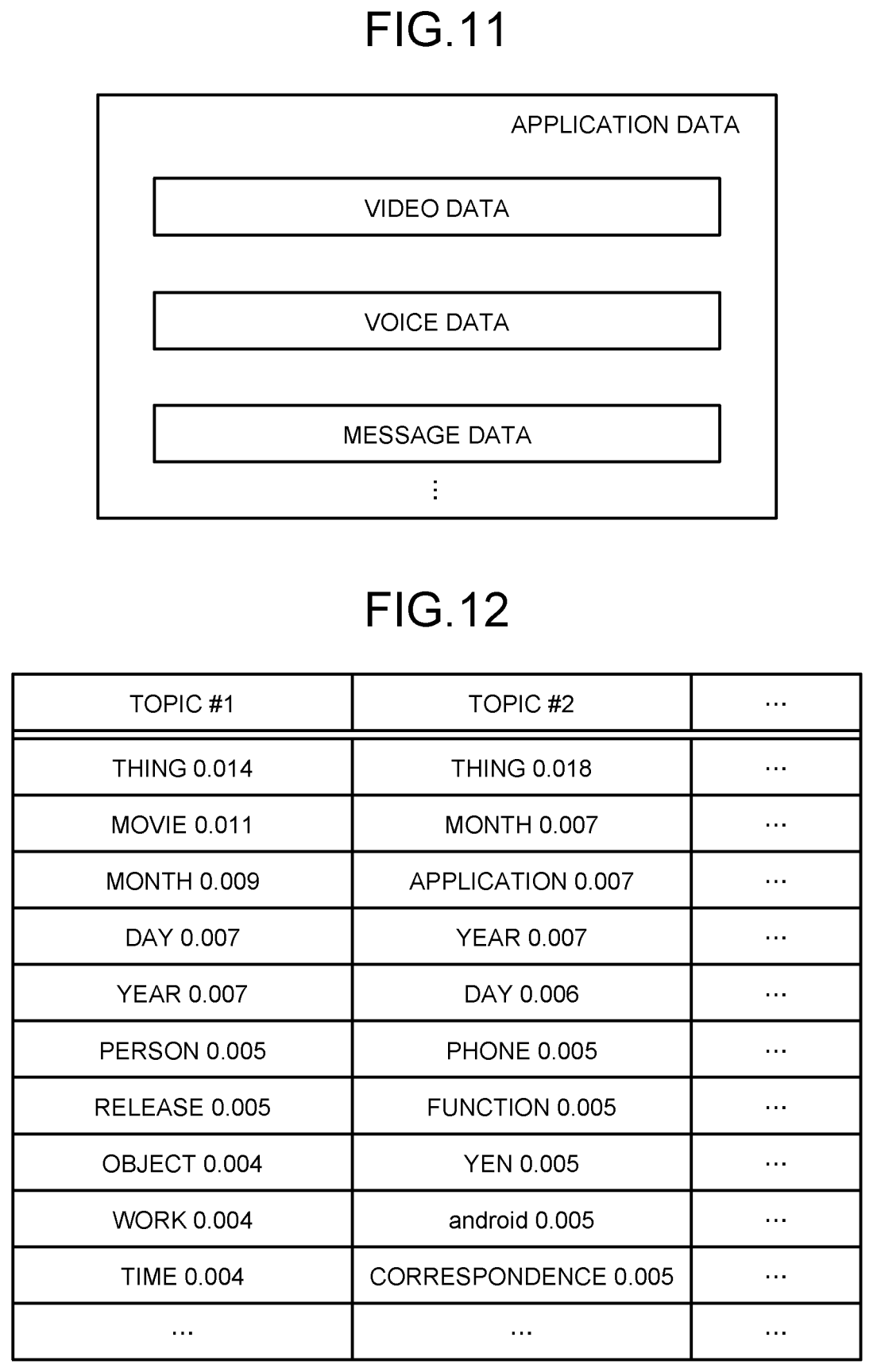

APPLICATION DATA

| VIDEO DATA |
|------------|

| VOICE DATA |
|------------|

| MESSAGE DATA |
|--------------|

| TOPIC #1 | TOPIC #2 | ··· |
|----------|----------|-----|
| THING 0.014 | THING 0.018 | ··· |
| MOVIE 0.011 | MONTH 0.007 | ··· |
| MONTH 0.009 | APPLICATION 0.007 | ··· |
| DAY 0.007 | YEAR 0.007 | ··· |
| YEAR 0.007 | DAY 0.006 | ··· |
| PERSON 0.005 | PHONE 0.005 | ··· |
| RELEASE 0.005 | FUNCTION 0.005 | ··· |
| OBJECT 0.004 | YEN 0.005 | ··· |
| WORK 0.004 | android 0.005 | ··· |
| TIME 0.004 | CORRESPONDENCE 0.005 | ··· |
| ··· | ··· | ··· |

START

S301
ACQUIRE MESSAGE LIST

S302
ACQUIRE SPEAKER TEXT

S303
EXECUTE TOPIC ANALYSIS

S304
CALCULATE SIMILARITY

S305
IDENTIFY MESSAGE

END

AI ASSISTANT

FOLLOWER C
"IT'S ONE WITH GREAT
BOX-OFFICE SALES"

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/022301 filed on Jun. 11, 2021. Each of the above-referenced applications is hereby incorporated herein by reference in its entirety.

FIELD

The present disclosure relates to an information processing apparatus, an information processing method, and an information processing program.

BACKGROUND

In recent years, development of an automatic interaction technology in which an interaction AI and a human have a conversation with each other has been actively conducted. In distribution of a radio program or the like, it is possible to broaden the conversation by utilizing the interaction AI as an assistant for interaction of a distributor (Hereinafter, also referred to as a speaker.) such as a main personality.

CITATION LIST

Patent Literature

Patent Literature 1: JP 2020-190585 A

SUMMARY

Technical Problem

In distribution such as live distribution, a viewer (Hereinafter, also referred to as a follower.) can transmit a message to a speaker (distributor) through an application such as a smartphone. The message from the follower is delivered to the distributor through the application of the smartphone. The speaker selects and reads out an interesting message from the received messages.

If the speaker can read all the messages and select an interesting message from the messages, the distribution can be expected to be greatly excited. However, it is difficult for the speaker to read all the messages under various circumstances, for example, the speaker is absorbed in speaking during distribution. In many cases, even if an interesting message arrives, the speaker will miss it.

Therefore, the present disclosure proposes an information processing apparatus, an information processing method, and a program capable of exciting distribution.

Note that the above problem or object is merely one of a plurality of problems or objects that can be solved or achieved by a plurality of embodiments disclosed in the present specification.

Solution to Problem

In order to solve the above problem, an information processing apparatus according to one embodiment of the present disclosure includes: an acquisition unit that acquires a plurality of messages in response to an utterance of a speaker; a calculation unit that calculates a degree of relevance between the utterance and each of the plurality of messages; an identification unit that identifies at least one message that satisfies a predetermined criterion regarding the degree of relevance among the plurality of messages; and a presentation processing unit that performs processing related to presentation of the identified message to the speaker.

BRIEF DESCRIPTION OF DRAWINGS

FIG. 9 is a diagram illustrating an example of assistant data.

FIG. 10 is a diagram illustrating a conversation scenario between a speaker and an AI assistant.

FIG. 11 is a diagram illustrating an example of application data.

FIG. 12 is a diagram illustrating information subjected to topic analysis.

DESCRIPTION OF EMBODIMENTS

Figure 1:
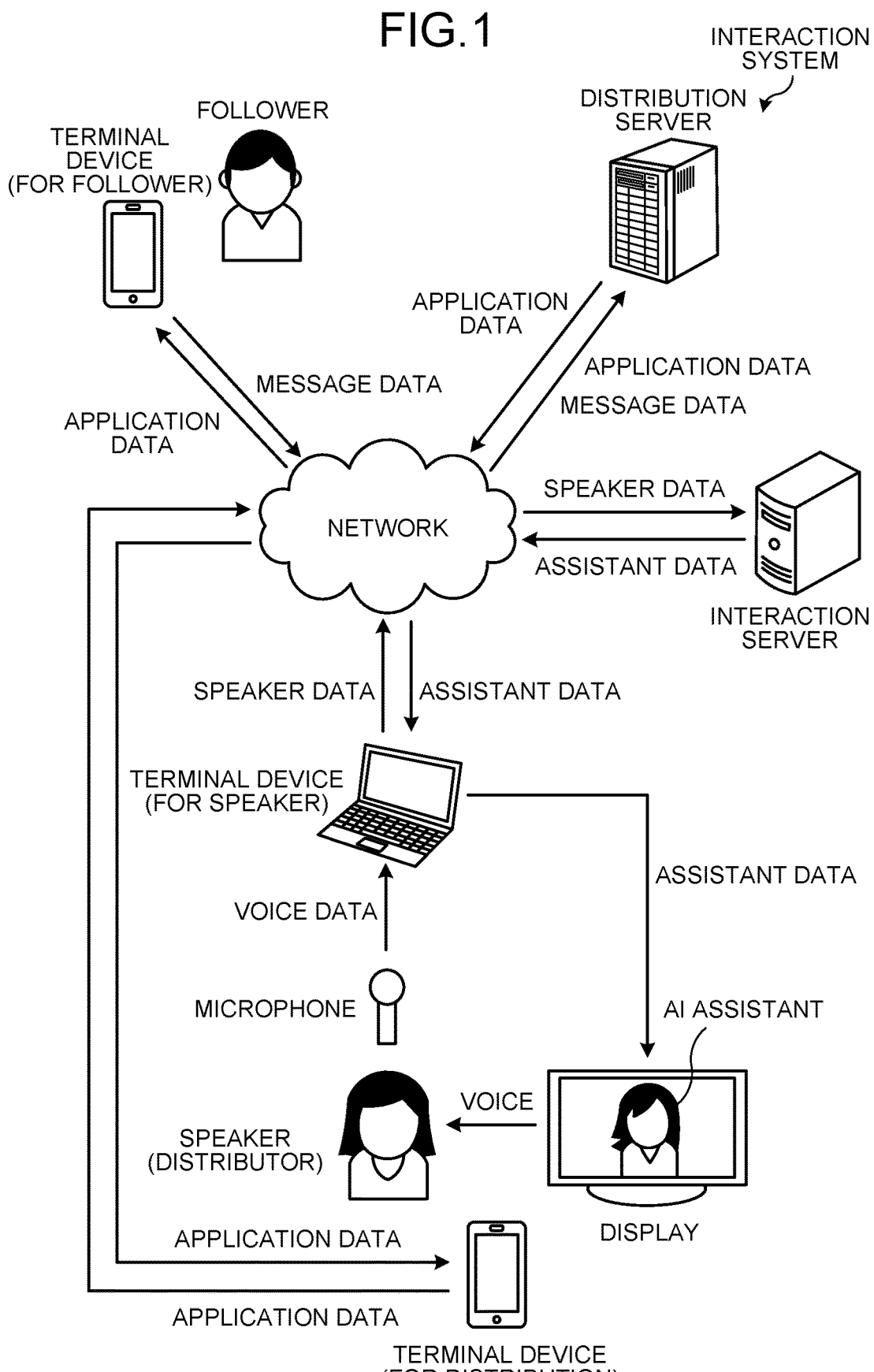
FIG. 1 is a diagram for explaining an overview of an interaction system of the present embodiment.

Hereinafter, embodiments of the present disclosure will be described in detail with reference to the drawings. Note that, in each of the following embodiments, the same parts are denoted by the same signs, and redundant description will be omitted.

Furthermore, in the present specification and the drawings, a plurality of configurations having substantially the same functional configuration may be distinguished by attaching different numerals after the same reference sign. For example, the plurality of configurations having substantially the same functional configuration is distinguished as terminal devices $30_1$, $30_2$, and $30_3$ as necessary. However, in a case where it is not particularly necessary to distinguish each of the plurality of components having substantially the same functional configuration, only the same reference sign is attached. For example, in a case where it is not necessary to particularly distinguish the terminal devices $30_1$, $30_2$, and $30_3$, they are simply referred to as terminal devices 30.

One or a plurality of embodiments (including examples and modified examples) described below can each be implemented independently. On the other hand, at least some of the plurality of embodiments described below may be implemented by being appropriately combined with at least some of other embodiments. The plurality of embodiments may include novel features different from each other. Therefore, the plurality of embodiments can contribute to solving different objects or problems, and can exhibit different effects.

Furthermore, the present disclosure will be described according to the following item order.

1. Overview
2. Configuration of interaction system
2-1. Configuration of distribution server
2-2. Configuration of interaction server
2-3. Configuration of terminal device
3. Operation of interaction system
4. Modified example
5. Conclusion

1. OVERVIEW

Various contents are distributed using a video distribution service. Among them, the popularity of content in which talents and the like live-distribute chats and the like is increasing. However, in a case where chats are regularly distributed, topics of the chats are likely to be depleted, and it is assumed that continuous distribution is difficult. In a radio program, there is an assistant in addition to a main personality, and the assistant becomes a conversation partner of a chat, so that it is possible to enrich a conversation.

In recent years, development of an automatic interaction technology in which a computer or a computer program (Hereinafter, it is referred to as interaction AI or simply AI.) and a human have a conversation has been advanced. If this AI is used as an assistant for interaction in distribution, it is possible to broaden the conversation.

In the live distribution, a viewer (Hereinafter, also referred to as a follower.) can transmit a message to a speaker (distributor) through an application such as a smartphone. The message from the follower is delivered to the distributor through the application of the smartphone. The speaker selects and reads out an interesting message from the received messages.

If the speaker can read all the messages and select an interesting message from the messages, it can be expected that the live distribution will be greatly excited. However, it is difficult for the speaker to read all the messages under various circumstances, for example, the speaker is absorbed in speaking during the live distribution. In many cases, even if an interesting message arrives, the speaker will miss it. Furthermore, the follower side is also in a situation of merely looking at the conversation between the speaker and the AI, and is expected to feel that the follower side has not entered the conversation.

Therefore, in the embodiment, live distribution (conversation between the speaker and the AI) is excited by enabling the speaker to check without missing an appropriate message from the follower. Furthermore, by enabling the speaker to check an appropriate message from the follower without missing it, the follower can feel as if the follower is participating in the conversation.

FIG. 1 is a diagram for explaining an overview of an interaction system of the present embodiment.

The interaction system includes a terminal device (for speaker), a terminal device (for distribution), a terminal device (for follower), a distribution server, and an interaction server. These devices are connected via a network such as the Internet.

A microphone, a display, and a speaker are built in or connected to a terminal device (for speaker). In the example of FIG. 1, a microphone and a display are connected to the terminal device (for speaker). Furthermore, in the example of FIG. 1, a speaker is built in the terminal device (for speaker). Furthermore, an AI assistant is projected on a display illustrated in FIG. 1. The AI assistant is a virtual character displayed on the display. This AI assistant becomes an interaction AI that interacts with a speaker. The voice of the AI assistant is output from the speaker of the terminal device (for speaker). Note that the display is desirably externally attached. This is because it is easy to display the AI assistant in a large size or to set a display location of the AI assistant to an arbitrary location.

The spoken voice of the speaker (distributor) is input to the microphone. The voice input to the microphone is converted into voice data and input to the terminal device (for speaker). The voice data input to the terminal device (for speaker) is transmitted to a network as speaker data. Here, the speaker data includes voice data and an ID of a speaker who is a sender of the voice file. Thereafter, the speaker data is input to the interaction server.

The interaction server generates data for an assistant. The assistant data is data for the AI assistant to perform correspondence according to the speaker data. The interaction server sends the assistant data to the network. The assistant data is input to the terminal device (for speaker) via the network.

The terminal device (for speaker) uses the assistant data to depict a figure of the AI assistant and show the figure on the display. At the same time, the terminal device (for speaker) reproduces the voice file of the AI assistant using the assistant data. The voice of the AI assistant is reproduced from the speaker.

The terminal device (for distribution) captures an image of the state of the conversation between the speaker and the AI assistant. The captured data is transmitted to the network as application data and reaches the distribution server. The distribution server transmits the application data from the speaker to the speaker or the follower. The application data reaches the terminal device (for distribution) and the terminal device (for follower) via the network. Each of the terminal device (for distribution) and the terminal device (for follower) reproduces the application data.

The follower sends the message to the network by using the terminal device (for follower). The message is a message by a follower for the utterance of the speaker. Although only one follower is illustrated in the example of FIG. 1, a plurality of followers may be provided. The message is input to the distribution server via the network. The distribution server distributes a message to the terminal device (for distribution) and the terminal device (for followers) via a network.

The interaction server acquires a plurality of messages by a plurality of followers from the distribution server. Then, a degree of relevance between the utterance of the speaker and each of the plurality of messages is calculated. The interaction server identifies at least one message that satisfies a predetermined criterion regarding the degree of relevance from among the plurality of messages. For example, the interaction server acquires a message having the highest degree of relevance with the utterance of the speaker from among the plurality of messages. Then, the interaction server performs processing related to presentation of the identified message to the speaker. The interaction server generates assistant data for presenting the identified message to the speaker. The interaction server sends the generated assistant data to the network. The assistant data is input to the terminal device (for speaker) via the network.

The terminal device (for speaker) uses the assistant data to depict a figure of the AI assistant and show the figure on the display. At the same time, the terminal device (for speaker) reproduces the voice of the message identified by the interaction server using the assistant data.

As a result, the speaker can check the appropriate message from the follower without missing it, so that the live distribution is excited. Furthermore, since the speaker can confirm the appropriate message from the follower without missing it, the follower can also feel as if he/she is participating in the conversation.

Although the overview of the present embodiment has been described above, the interaction system 1 according to the present embodiment will be described in detail below.

2. CONFIGURATION OF INTERACTION SYSTEM

First, a configuration of the interaction system 1 will be described.

Figure 2:
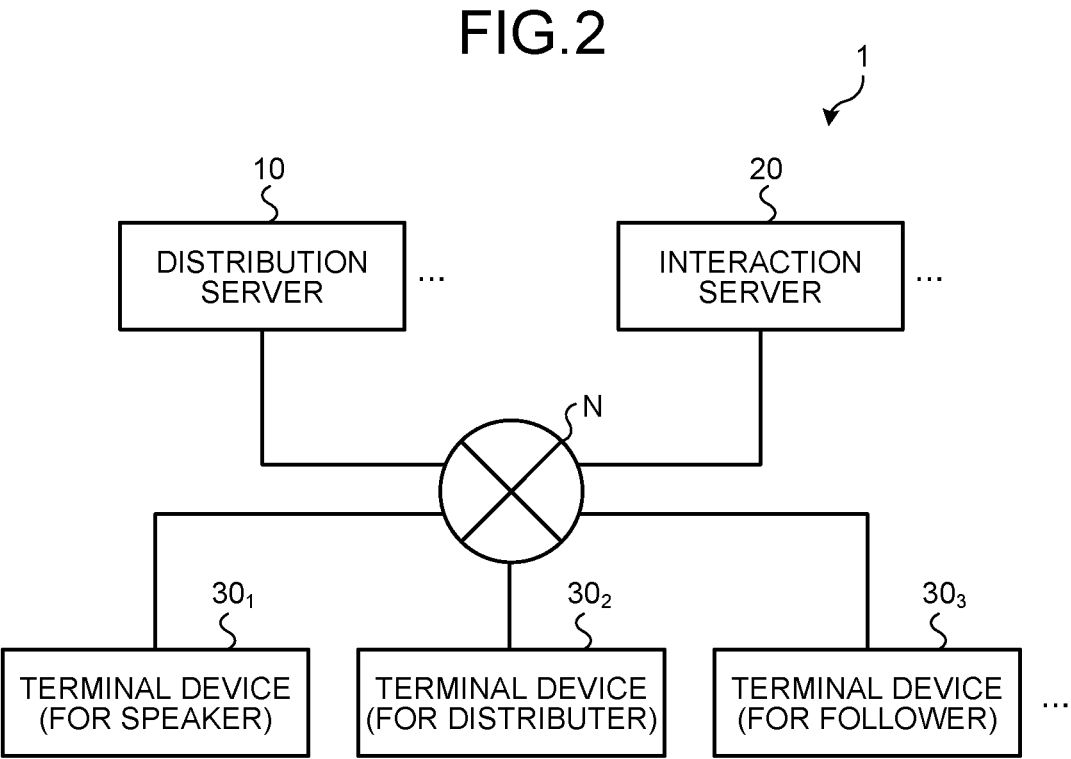
FIG. 2 is a diagram illustrating a configuration example of an interaction system according to an embodiment of the present disclosure.

FIG. 2 is a diagram illustrating a configuration example of the interaction system 1 according to the embodiment of the present disclosure. The system is a system that realizes a conversation between a speaker and AI in distribution using a network. The interaction system 1 includes a distribution server 10, an interaction server 20, and a terminal device 30. Note that the devices in the drawing may be considered as devices in a logical sense. That is, a part of the device in the drawing may be realized by a virtual machine (VM), a container, a docker, or the like, and they may be implemented on physically the same hardware.

The distribution server 10, the interaction server 20, and the terminal device 30 each have a communication function and are connected via a network N. The distribution server 10, the interaction server 20, and the terminal device 30 can be rephrased as communication devices. Note that, although only one network N is illustrated in the example of FIG. 2, a plurality of networks N may exist.

Here, the network N is a communication network such as a local area network (LAN), a wide area network (WAN), a cellular network, a fixed telephone network, a regional Internet protocol (IP) network, or the Internet. The network N may include a wired network or a wireless network. Furthermore, the network N may include a core network. The core network is, for example, an evolved packet core (EPC) or a 5G core network (5GC). Furthermore, the network N may include a data network other than the core network. The data network may be a service network of a telecommunications carrier, for example, an IP Multimedia Subsystem (IMS) network. Furthermore, the data network may be a private network such as an intra-company network.

Hereinafter, the configuration of each device constituting the interaction system 1 will be specifically described. Note that the configuration of each device described below is merely an example. The configuration of each device may be different from the following configuration.

2-1. Configuration of Distribution Server

First, a configuration of the distribution server 10 will be described.

The distribution server 10 is an information processing apparatus (computer) having functions necessary for distribution, viewing, and message exchange. The distribution server 10 distributes the distribution content created or captured by the distributor to the viewer (follower). The number of followers may be one or more.

Any form of computer can be employed as the distribution server 10. For example, the distribution server 10 is an application server or a web server. The distribution server 10 may be a PC server, a midrange server, or a mainframe server. Furthermore, the distribution server 10 may be an information processing apparatus that performs data processing (edge processing) near the user or the terminal. For example, the distribution server may be an information processing apparatus (computer) provided side by side or built in a base station or a roadside unit. Of course, the distribution server 10 may be an information processing apparatus that performs cloud computing.

Figure 3:
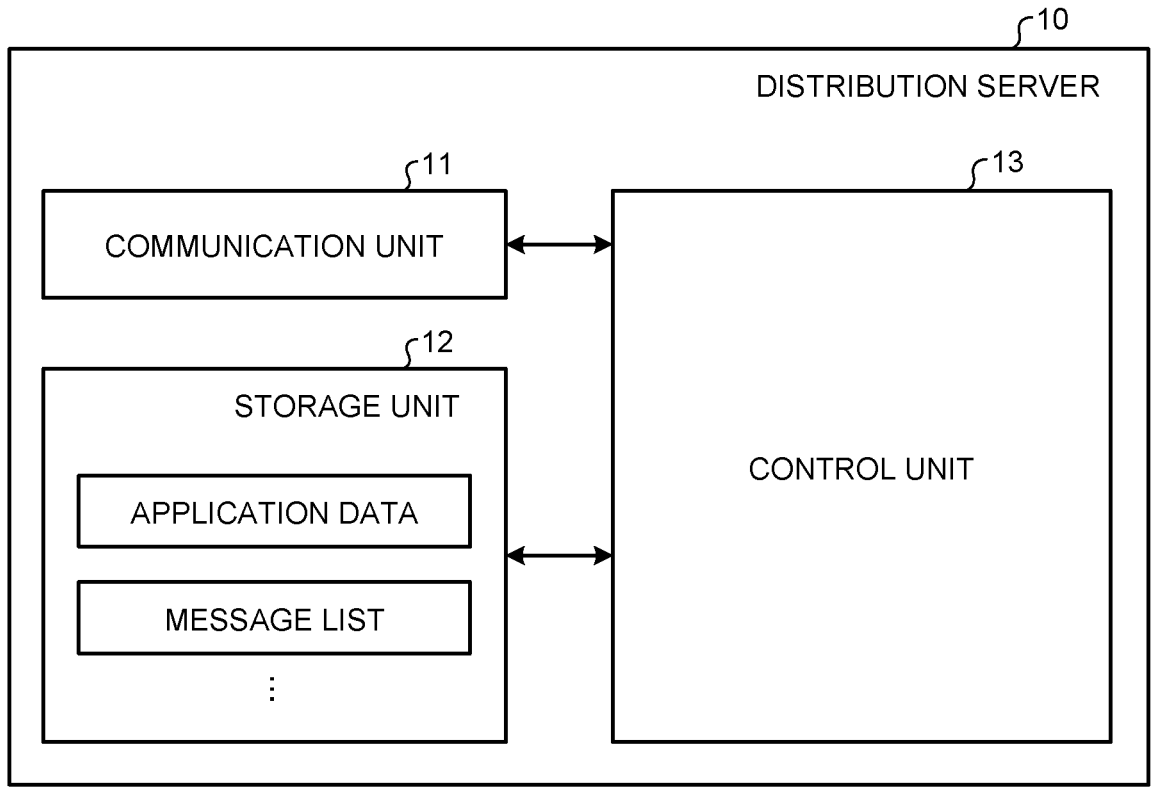
FIG. 3 is a diagram illustrating a configuration example of a distribution server according to the embodiment of the present disclosure.

FIG. 3 is a diagram illustrating a configuration example of the distribution server 10 according to the embodiment of the present disclosure. The distribution server 10 includes a communication unit 11, a storage unit 12, and a control unit 13. Note that the configuration illustrated in FIG. 3 is a functional configuration, and a hardware configuration may be different from the functional configuration. Furthermore, the functions of the distribution server 10 may be implemented in a distributed manner in a plurality of physically separated configurations. For example, the distribution server 10 may include a plurality of server devices.

The communication unit 11 is a communication interface for communicating with other devices. For example, the communication unit 11 is a local area network (LAN) interface such as a network interface card (NIC). The communication unit 11 may be a wired interface or a wireless interface. The communication unit 11 communicates with the interaction server 20, the terminal device 30, and the like under the control of the control unit 13.

The storage unit 12 is a data readable/writable storage device such as a dynamic random access memory (DRAM), a static random access memory (SRAM), a flash memory, or a hard disk. The storage unit 12 functions as storage means of the distribution server 10. The storage unit 22 stores, for example, application data, a message list, and the like. The message list stores, for example, a plurality of pieces of message data transmitted from a plurality of followers and accumulated within a predetermined period. The application data will be described later.

The control unit 13 is a controller that controls each unit of the distribution server 10. The control unit 13 is realized by, for example, a processor such as a central processing unit (CPU), a micro processing unit (MPU), or a graphics processing unit (GPU). For example, the control unit 13 is realized by the processor executing various programs stored in a storage device inside the distribution server 10 using a random access memory (RAM) or the like as a work area. Note that the control unit 13 may be realized by an integrated circuit such as an application specific integrated circuit (ASIC) or a field programmable gate array (FPGA). Any of the CPU, the MPU, the GPU, the ASIC, and the FPGA can be regarded as a controller.

2-2. Configuration of Interaction Server

Next, a configuration of the interaction server 20 will be described.

The interaction server 20 is an information processing apparatus (computer) that controls the AI assistant. The interaction server 20 receives speaker data transmitted from the terminal device 30₁ (terminal device for speaker) and performs voice recognition processing. The interaction server 20 performs interactive processing and avatar motion processing according to a result of the voice recognition processing. The interaction server 20 has, for example, a voice recognition function, a voice synthesis function, an interactive processing function, an avatar motion function, and a message selection function.

Any form of computer can be employed as the interaction server 20. For example, the interaction server 20 is an application server or a web server. The interaction server 20 may be a PC server, a midrange server, or a mainframe server. Furthermore, the interaction server 20 may be an information processing apparatus that performs data processing (edge processing) near the user or the terminal. For example, the distribution server may be an information processing apparatus (computer) provided side by side or built in a base station or a roadside unit. Of course, the interaction server 20 may be an information processing apparatus that performs cloud computing.

Figure 4:
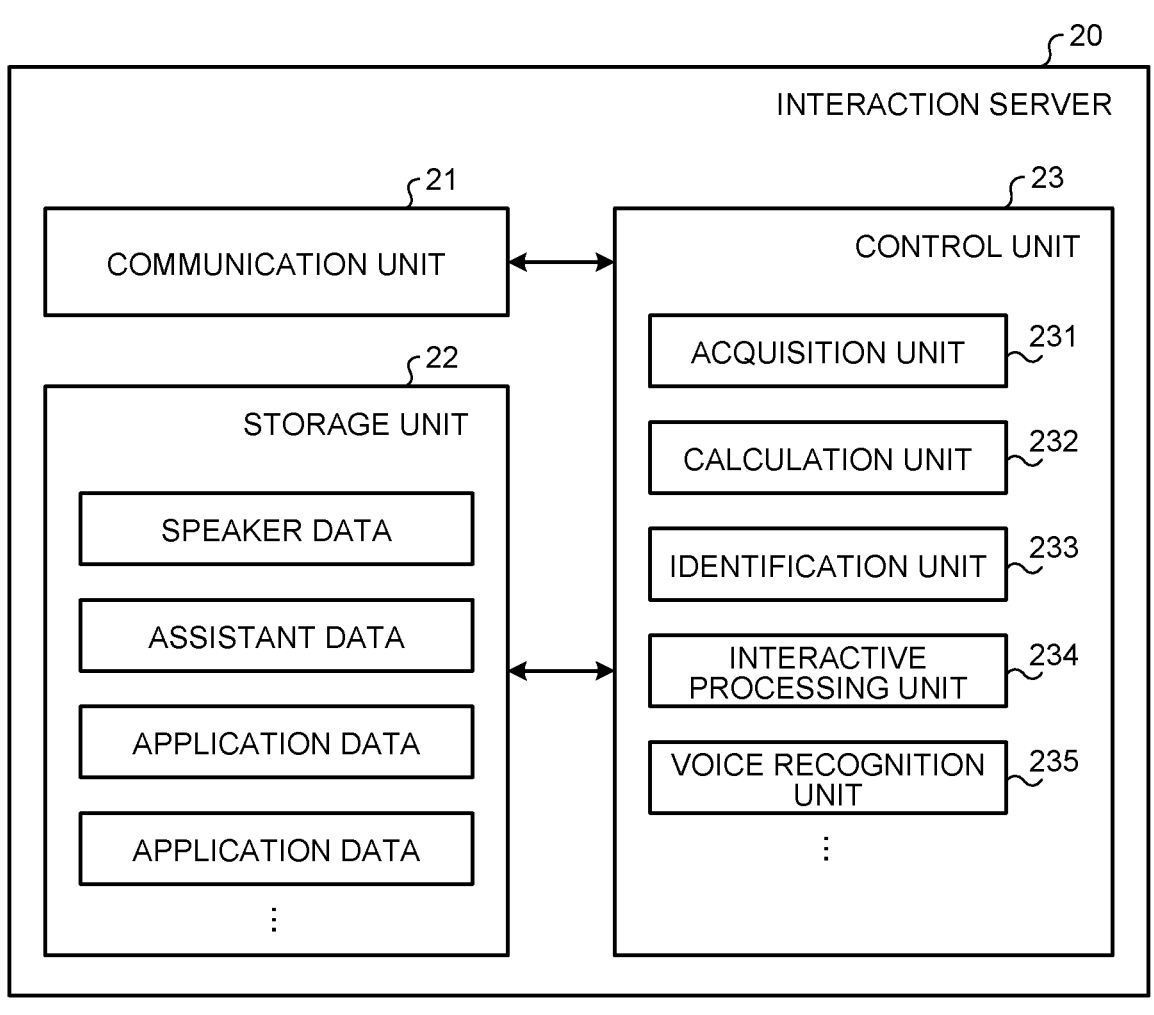
FIG. 4 is a diagram illustrating a configuration example of an interaction server according to the embodiment of the present disclosure.

FIG. 4 is a diagram illustrating a configuration example of the interaction server 20 according to the embodiment of the present disclosure. The interaction server 20 includes a communication unit 21, a storage unit 22, and a control unit 23. Note that the configuration illustrated in FIG. 4 is a functional configuration, and a hardware configuration may be different from the functional configuration. Furthermore, the functions of the interaction server 20 may be implemented in a distributed manner in a plurality of physically separated configurations. For example, the interaction server 20 may include a plurality of server devices.

The communication unit 21 is a communication interface for communicating with other devices. For example, the communication unit 21 is a LAN interface such as an NIC. The communication unit 21 may be a wired interface or a wireless interface. The communication unit 21 communicates with the distribution server 10, the terminal device 30, and the like under the control of the control unit 23.

The storage unit 22 is a data readable/writable storage device such as a DRAM, an SRAM, a flash memory, or a hard disk. The storage unit 22 functions as storage means of the interaction server 20. The storage unit 22 stores, for example, speaker data, assistant data, application data, a message list, and the like. As described above, a plurality of pieces of message data is stored in the message list. The message list is acquired from the distribution server 10. The speaker data, the assistant data, and the application data will be described later.

The control unit 23 is a controller that controls each unit of the interaction server 20. The control unit 23 is realized by, for example, a processor such as a CPU, an MPU, or a GPU. For example, the control unit 23 is realized by the processor executing various programs stored in a storage device inside the interaction server 20 using a RAM or the like as a work area. Note that the control unit 23 may be realized by an integrated circuit such as an ASIC or an FPGA. Any of the CPU, the MPU, the GPU, the ASIC, and the FPGA can be regarded as a controller.

The control unit 23 includes an acquisition unit 231, a calculation unit 232, an identification unit 233, an interactive processing unit 234, and a voice recognition unit 235. The interactive processing unit 234 can also be referred to as a presentation processing unit. Each block (the acquisition unit 231 to the voice recognition unit 235) constituting the control unit 23 is a functional block indicating a function of the control unit 23. These functional blocks may be software blocks or hardware blocks. For example, each of the functional blocks described above may be one software module realized by software (including a microprogram), or may be one circuit block on a semiconductor chip (die). Of course, each functional block may be one processor or one integrated circuit. The control unit 23 may be configured by a functional unit different from the above-described functional block. A configuration method of the functional block is arbitrary. The operation of these functional blocks will be described later. Furthermore, some or all of the operations of these functional blocks may be executed by another device (for example, the distribution server 10 or the terminal device 30).

2-3. Configuration of Terminal Device

Next, a functional configuration of the terminal device 30 will be described.

The terminal device 30 is a user terminal possessed by a user. The terminal device 30 is connected to the network N, the distribution server 10, and/or the interaction server 20. A distribution application is installed in the terminal device 30. The user can transmit and receive content and messages through the distribution application.

The terminal device 30 is an information processing apparatus (computer) such as a personal computer. The terminal device 30 may be a distribution facility for distributing content. Furthermore, the terminal device 30 may be a mobile terminal such as a mobile phone, a smart device (smartphone or tablet), a personal digital assistant (PDA), or a notebook PC. Furthermore, the terminal device 30 may be a wearable device such as a smart watch. Furthermore, the terminal device 30 may be an xR device such as an augmented reality (AR) device, a virtual reality (VR) device, or a mixed reality (MR) device. At this time, the xR device may be a glasses-type device such as AR glasses or MR glasses, or may be a head-mounted device such as a VR head-mounted display. Furthermore, the terminal device 30 may be a portable Internet of Things (IoT) device. Furthermore, the terminal device 30 may be a motorcycle, a moving relay vehicle, or the like on which a communication device such as a field pickup unit (FPU) is mounted. Furthermore, the terminal device 30 may be an Internet of Things (IoT) device.

Figure 5:
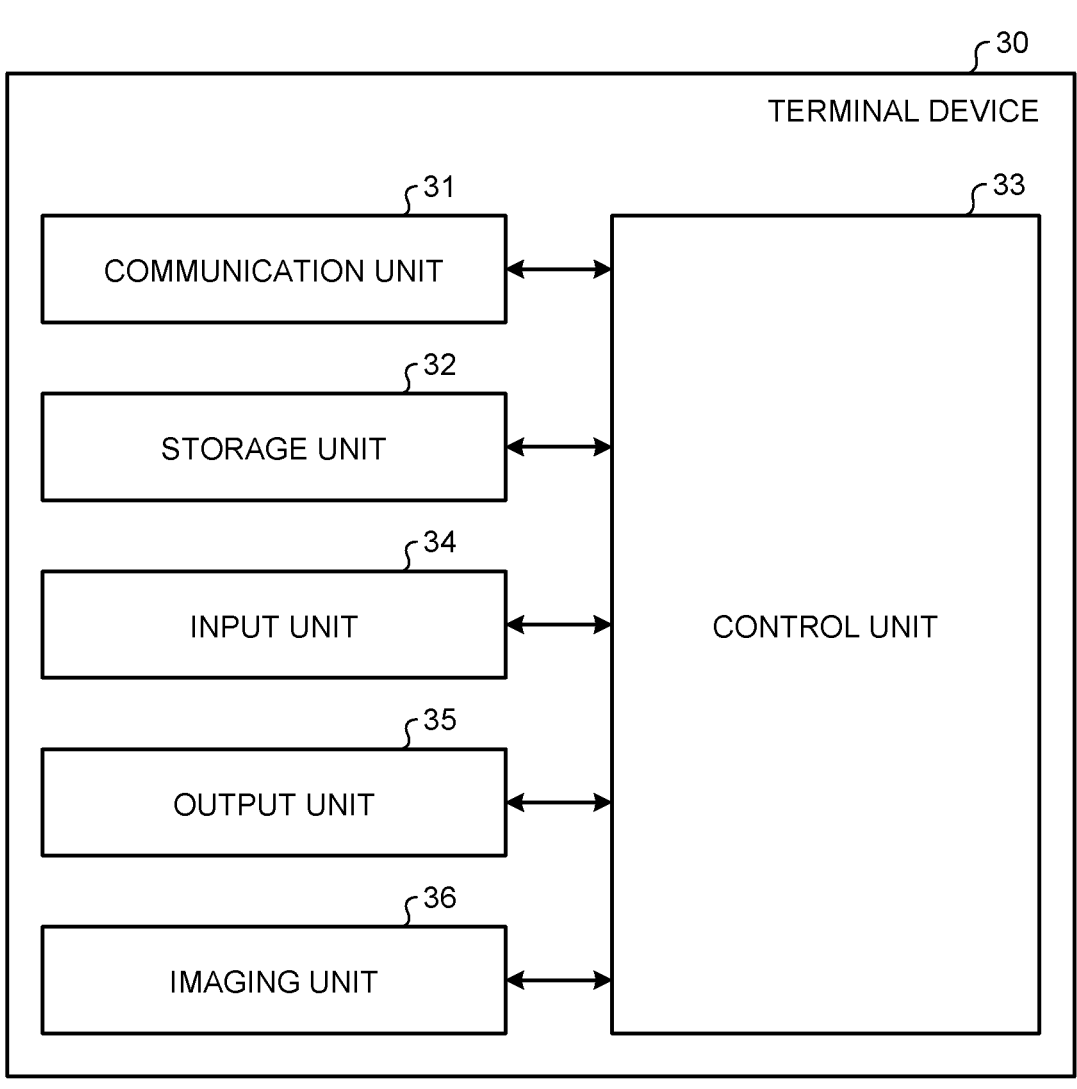
FIG. 5 is a diagram illustrating a configuration example of a terminal device according to the embodiment of the present disclosure.

FIG. 5 is a diagram illustrating a configuration example of the terminal device 30 according to the embodiment of the present disclosure. The terminal device 30 includes a communication unit 31, a storage unit 32, a control unit 33, an input unit 34, an output unit 35, and an imaging unit 36. Note that the configuration illustrated in FIG. 5 is a functional configuration, and a hardware configuration may be different from the functional configuration. Furthermore, the functions of the terminal device 30 may be implemented in a distributed manner in a plurality of physically separated configurations.

The communication unit 31 is a communication interface for communicating with other devices. For example, the communication unit 31 is a LAN interface such as an NIC. The communication unit 31 may be a wired interface or a wireless interface.

In a case where the communication unit 31 includes a wireless interface, the communication unit 31 may be configured to connect to the network N using a wireless access technology such as LTE, NR, Wi-Fi, or Bluetooth (registered trademark). At this time, the communication devices may be configured to be able to use different radio access technologies. For example, the communication device may be configured to be able to use NR and Wi-Fi. Furthermore, the communication device may be configured to be able to use different cellular communication technologies (for example, LTE and NR). In addition, the terminal device 30 may be connectable to the network N using a radio access technology other than LTE, NR, Wi-Fi, and Bluetooth.

The storage unit 32 is a data readable/writable storage device such as a DRAM, an SRAM, a flash memory, or a hard disk. The storage unit 32 functions as storage means of the terminal device 30.

The control unit 33 is a controller that controls each unit of the terminal device 30. The control unit 33 is realized by, for example, a processor such as a CPU, an MPU, or a GPU. For example, the control unit 33 is realized by a processor executing various programs stored in a storage device inside the terminal device 30 using a RAM or the like as a work area. Note that the control unit 33 may be realized by an integrated circuit such as an ASIC or an FPGA. Any of the CPU, the MPU, the GPU, the ASIC, and the FPGA can be regarded as a controller.

The input unit 34 is an input device that receives various inputs from the outside. For example, the input unit 34 is an operation device for the user to perform various operations such as voice input using a keyboard, a mouse, an operation key, or a microphone. Note that, in a case where a touch panel is adopted for the terminal device 30, the touch panel is also included in the input unit 34. In this case, the user performs various operations by touching the screen with a finger or a stylus.

The output unit 35 is a device that performs various outputs such as sound, light, vibration, and an image to the outside. The output unit 35 performs various outputs to the user under the control of the control unit 33. Note that the output unit 35 includes a display device that displays various types of information. The display device is, for example, a liquid crystal display or an organic EL display. Note that the output unit 35 may be a touch panel type display device. In this case, the output unit 35 may be regarded as a configuration integrated with the input unit 34.

The imaging unit 36 is a conversion unit that converts an optical image into an electric signal. Note that an image captured by the imaging unit 36 is not limited to a video (moving image), and may be a still image.

3. OPERATION OF INTERACTION SYSTEM

Although the configuration of the interaction system 1 has been described above, the operation of the interaction system 1 having such a configuration will be described below.

Figure 6:
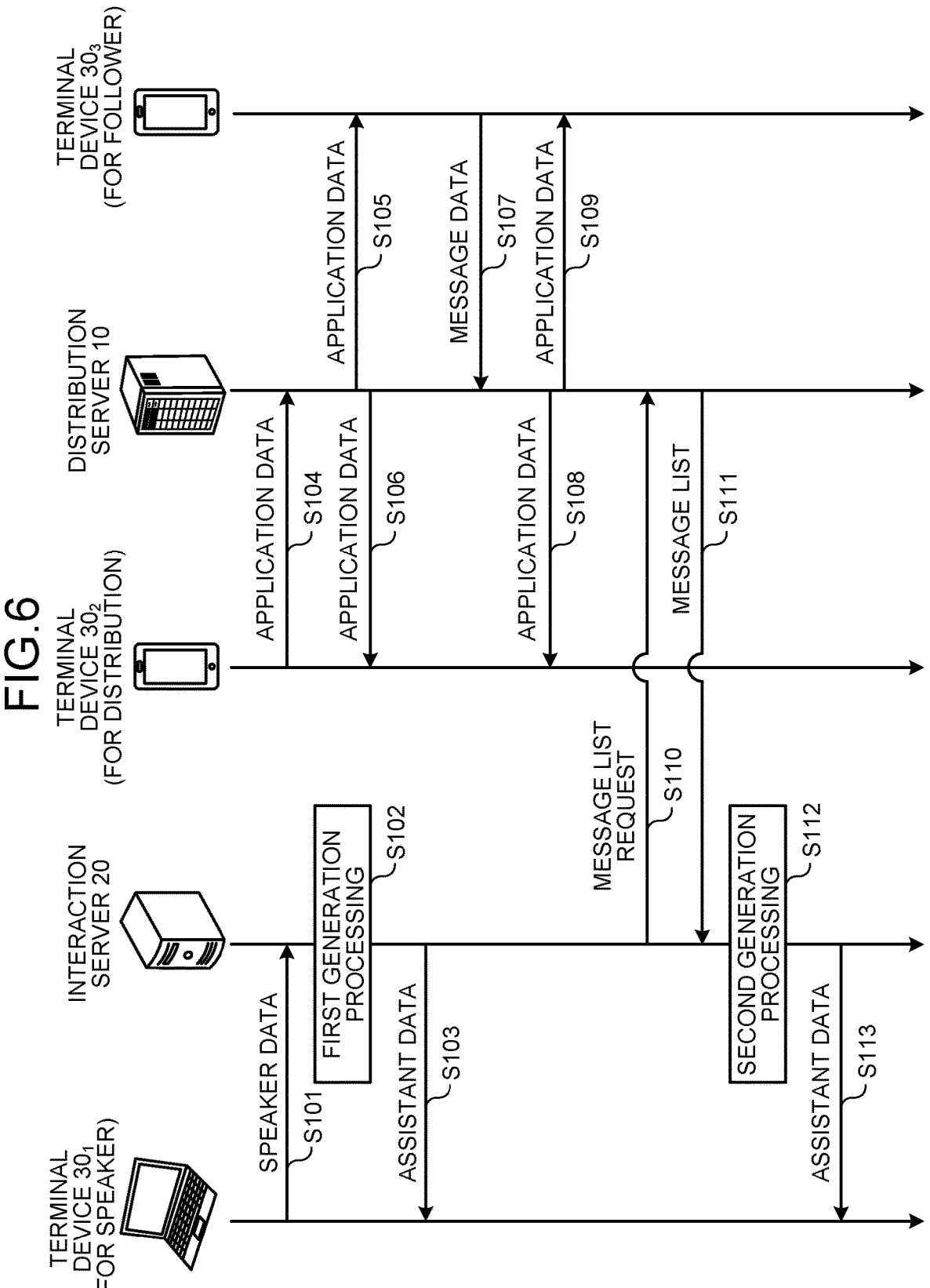
FIG. 6 is a sequence diagram illustrating distribution processing.

FIG. 6 is a sequence diagram illustrating distribution processing. The distribution processing will be described below with reference to FIG. 6.

When the speaker speaks, it is converted into voice data and input to the terminal device 30₁ for speaker. The terminal device 30 transmits the input voice data as speaker data to the interaction server 20 (Step S101). Here, the speaker data includes voice data and a user ID (speaker ID) of a sender of the voice file.

Figures 7, 8:
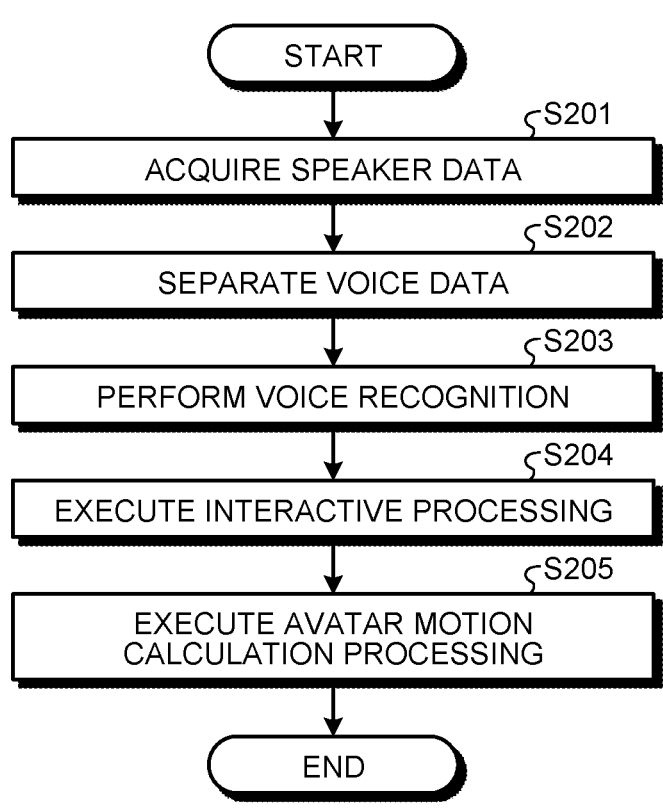
FIG. 7 is a flowchart illustrating first generation processing.
FIG. 8 is a diagram illustrating an example of speaker data.

When receiving the speaker data from the terminal device 30₁, the interaction server 20 executes first generation processing for generating assistant data (Step S102). The assistant data is control data for causing the AI assistant to perform correspondence according to the speaker data. FIG. 7 is a flowchart illustrating the first generation processing. The first generation processing is executed by the control unit 23 of the interaction server 20. Hereinafter, the first generation processing will be described with reference to the flowchart of FIG. 7.

The acquisition unit 231 of the interaction server 20 acquires the speaker data transmitted from the terminal device 30₁ (Step S201). FIG. 8 is a diagram illustrating an example of the speaker data. As described above, the speaker data includes voice data and a user ID (speaker's ID) of a sender of the voice file.

Returning to FIG. 7, the acquisition unit 231 classifies the speaker data into voice data and a user ID (Step S202). Then, the voice recognition unit 235 of the interaction server 20 performs voice recognition processing on the voice data (Step S203). A speaker text is generated by the voice recognition processing. Note that the voice recognition processing may be executed in the interaction server or may be executed by an external device.

Subsequently, the interactive processing unit 234 of the interaction server 20 executes the interactive processing (Step S204). In the interactive processing, an utterance text that is an appropriate conversational sentence is generated according to the speaker text. The interactive processing uses, for example, artificial intelligence markup language (AIML). A description example of the AIML will be described below.

```
<category>
    <pattern> well* </pattern>
    <template> I'm fine! </template>
</category>
```

In this example, when a word "well*" surrounded by <pattern> and </pattern> is present in the speaker text, the interactive processing unit 234 generates an utterance text of "I'm fine!". Here, the asterisk (*) of "well*" is a wildcard character meaning that any utterance is acceptable.

Figure 9:
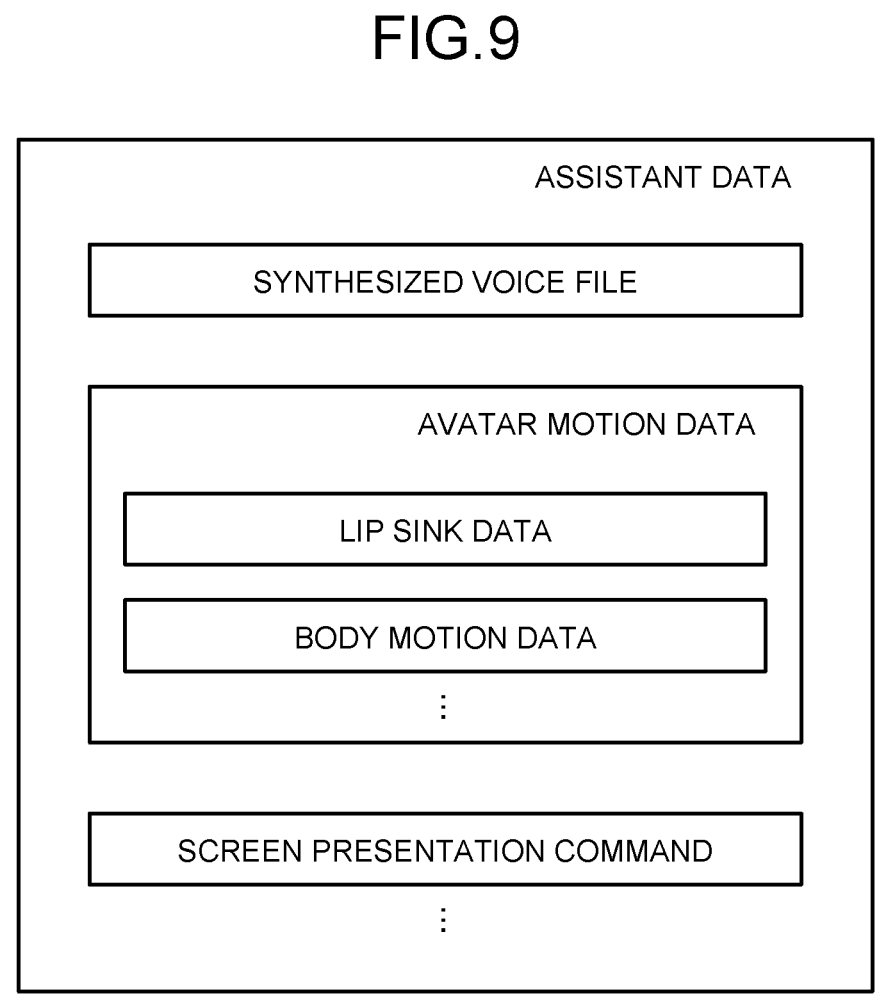

Next, the interactive processing unit 234 executes avatar motion calculation processing (Step S205). In the avatar motion calculation processing, a voice synthesis file, avatar motion data, and a screen presentation command are generated on the basis of the utterance text. FIG. 9 is a diagram illustrating an example of the assistant data.

The voice synthesis file is obtained by converting the utterance text into voice data. Furthermore, the avatar motion data is data for causing the AI assistant to perform an operation along the utterance by the voice data. Furthermore, the screen presentation command is data for controlling a portion other than the operation of the AI assistant, such as a telop or a background on the display.

Note that the avatar motion data includes lip sink data and body motion data. The lip sink data is data for controlling the motion of the mouth of the AI assistant when the terminal device 30₁ reproduces the voice synthesis file. As a control method, it is conceivable that the terminal device 30₁ controls the size of the mouth according to the volume of the voice data. The body motion data is data used by the terminal device 30₁ to control the motion of the AI assistant other than the mouth. The body motion data stores information for the terminal device 30₁ to select an avatar animation. For example, the body motion data stores information such as normal, smiling, angry, and thinking. These animations may be controlled by a drawing engine in the terminal device 30₁. Here, examples of the drawing engine include various game engines. At the time of calculating the avatar motion, the interactive processing unit 234 refers to the user ID. This is to distinguish between an utterance action for the speaker and an utterance action for the follower.

The interactive processing unit 234 combines the voice file, the avatar motion data, and the screen presentation command as assistant data.

Returning to FIG. 6, the interaction server 20 transmits the assistant data generated in the first generation processing to the terminal device $30_1$. The terminal device $30_1$ operates the AI assistant on the basis of the assistant data. The terminal device $30_1$ depicts a figure of the AI assistant using the assistant data, and displays the figure on the display. The rendering on the display may use a drawing engine. At the same time, the terminal device $30_1$ reproduces the voice synthesis file of the AI assistant using the assistant data.

The conversation between the speaker and the AI assistant proceeds according to a prepared scenario. FIG. 10 is a diagram illustrating a conversation scenario between the speaker and the AI assistant. The scenario is advanced in a form in which the AI assistant answers the utterance of the speaker. The AI assistant is a mechanism that detects an "activation word" that is a special word among the utterances of the speaker and then performs an utterance corresponding to the activation word. The activation word corresponds to a word indicated by parentheses ([ ]). For example, as in the conversation turn 3, the AI assistant may react to a combination of multiple activation words of [last weekend] and [movie]. The utterance of the speaker at each turn is input to the interaction server as speaker data. On the other hand, the utterance of the AI assistant is generated by the interaction server.

Returning to FIG. 6, the terminal device $30_2$ captures an image of the state of the conversation between the speaker and the AI assistant. The terminal device $30_2$ generates application data on the basis of the captured data. FIG. 11 is a diagram illustrating an example of the application data. The application data stores data related to distribution of video data, voice data, message data, and the like. Returning to FIG. 6, the terminal device $30_2$ transmits the generated application data to the distribution server 10 (Step S104).

When receiving the application data, the distribution server 10 transmits the received application data to the terminal device $30_2$ and the terminal device $30_3$ (Steps S105 and S106). The terminal device $30_2$ and the terminal device $30_3$ receive the application data transmitted from the distribution server. Then, each of the terminal device $30_2$ and the terminal device $30_3$ reproduces the application data. For example, the terminal device $30_2$ and the terminal device $30_3$ reproduce captured data (video data and/or voice data) included in the application data.

The distribution application installed in the terminal device 30 has a message transmission/reception function. The follower can transmit a text message (for example, a message such as "It's one with great box-office sales") for the speaker (distributor) to the conversation between the speaker and the AI assistant using the message transmission/reception function. The terminal device $30_3$ transmits the message data to the distribution server 10 according to the operation of the follower (Step S107). When receiving the message data, the distribution server 10 incorporates the received message data into the application data. Note that the distribution server 10 may incorporate a plurality of messages transmitted from a plurality of followers into the application data. The distribution server 10 transmits the application data to the terminal device $30_2$ and the terminal device $30_3$ (Steps S108 and S109). Each of the terminal device $30_2$ and the terminal device $30_3$ reproduces the application data. For example, the terminal device $30_2$ and the terminal device $30_3$ reproduce the message data included in the application data.

Next, the interaction server 20 identifies a message that satisfies a predetermined criterion among the plurality of messages distributed by the distribution server 10 as a message to be presented to the speaker (steps S110 to S112). In the conventional technique, the speaker needs to look for and read a message according to a topic by himself/herself from a plurality of messages displayed on the terminal device $30_2$. However, in the present embodiment, the AI assistant reads the message along the topic. Hereinafter, the technique will be described in detail.

The interaction server 20 requests the distribution server 10 for a list of messages (Hereinafter, the list is referred to as a message list.) transmitted by the followers (Step S110). The distribution server 10 transmits the message list to the interaction server 20 in response to a request from the interaction server 20. The interaction server 20 receives the message list from the distribution server 10 (Step S111). Note that an application programming interface (API) for acquiring the messages of the followers is provided by various distribution platforms. Hereinafter, an example of the message list acquired by the interaction server 20 will be described.

[Follower name: A, Channel: URL 1]
Message 1
[Follower name: B, Channel: URL 2]
Message 2
[Follower name: C, Channel: URL 3]
Message 3 ("It's one with great box-office sales")

In this example, the message 3 by the follower name: C is "It's one with great box-office sales".

The interaction server 20 identifies a message to be presented to the speaker from the plurality of messages stored in the message list. Hereinafter, topic analysis which is one of methods of identifying a message will be described.

FIG. 12 illustrates information subjected to the topic analysis based on several articles on the Internet. Here, the topic analysis refers to genre-division work of topics by analyzing words used in conversations and messages. In the example of FIG. 12, in order to facilitate understanding, genre classification is performed in two topics. In the topic #1, it can be seen that an appearance probability of the word related to "movie" is high. In the topic #2, it can be seen that a word related to "smartphone" appears. The results of applying this topic analysis to the conversation between the speaker and the AI assistant are the right two columns in FIG. 10. Since the conversation turn 1 and the conversation turn 2 are greetings, they were excluded from the analysis.

"I watched a movie last weekend" "What movie?" of the conversation turn 3 is subjected to the topic analysis. The appearance probability of the used word is as follows.

Topic #1: 0.8647589, Topic #2: 0.13524114

Since the appearance probability related to the topic #1 is high, it can be determined that the topic of the conversation in the conversation turn 3 is related to the topic #1.

Furthermore, the topic analysis is performed on "It's a popular animation movie" "Oh, that's good!" of the conversation turn 4. The appearance probability of the used word is as follows.

Topic #1: 0.83424604, Topic #2: 0.16575399

Since the appearance probability related to the topic #1 is high, it can be determined that the topic of the conversation in the conversation turn 4 is also related to the topic #1.

Next, the message "it's one with great box-office sales" from the follower is subjected to the topic analysis. The appearance probability of the used word is as follows.

Topic #1: 0.85199857, Topic #2: 0.1480014

Since the appearance probability related to the topic #1 is high, it can be determined that the message from the follower is also related to the topic #1.

By using the topic analysis in this manner, it is possible to compare the topic of the conversation between the speaker and the AI assistant with the topic of the message from the follower.

As a method of determining the closeness (degree of relevance) between the conversation between the speaker and the AI assistant and the topic of the message from the follower, a method based on "cosine similarity" can be used. This method is a method in which an angle formed by a topic vector of a conversation between the speaker and the AI assistant and a topic vector of the message of the follower is obtained by treating a plurality of topics as vectors, and as the angle is closer to "1", both are determined to be topics having a higher degree of relevance (similar topics). The interaction server 20 calculates cosine similarity for each of the plurality of messages, and identifies a message with high degree of relevance from the plurality of messages on the basis of the calculation result. For example, the interaction server 20 selects one or a plurality of messages in descending order of cosine similarity. As a result, the interaction server 20 can identify a message suitable for being presented to the speaker from the plurality of messages. Note that, although the method using cosine similarity is exemplified here, other methods may be used.

Figure 13:
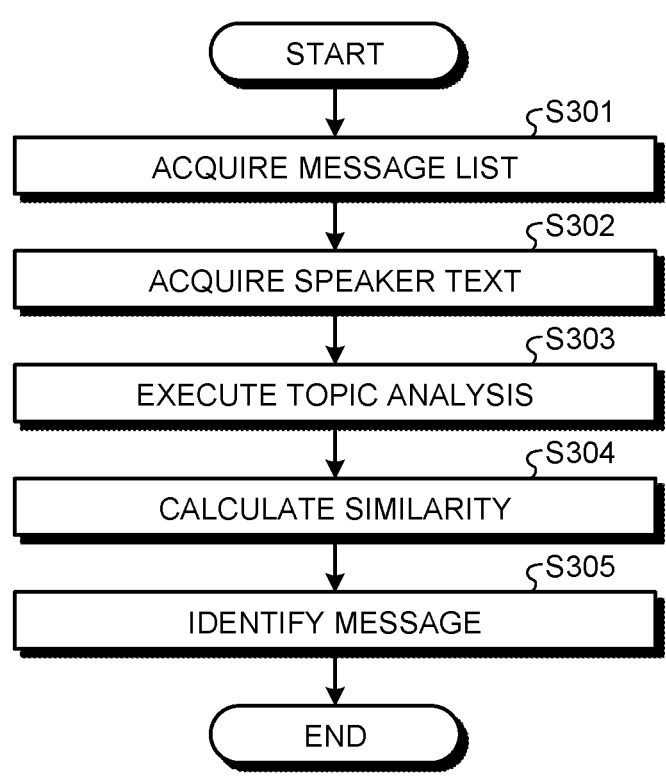
FIG. 13 is a flowchart illustrating second generation processing.

Based on the above, the operation of the interaction server 20 will be described. Returning to FIG. 6, when receiving the message list, the interaction server 20 executes second generation processing (Step S112). FIG. 13 is a flowchart illustrating the second generation processing. The second generation processing is executed by the control unit 23 of the interaction server 20. Hereinafter, the second generation processing will be described with reference to the flowchart of FIG. 13.

First, the acquisition unit 231 of the interaction server 20 acquires the message list received from the distribution server 10 (Step S301). The acquisition unit 231 acquires the speaker text (Step S302). As described in the portion of the first generation processing in FIG. 7, the speaker text is obtained by converting a conversation between the speaker and the AI assistant into a text.

The calculation unit 232 of the interaction server 20 executes the topic analysis of one message or each of a plurality of messages included in the message list, and calculates a topic vector. Furthermore, the calculation unit 232 executes the topic analysis unit of the speaker text and calculates a topic vector (Step S303). The calculation unit 232 calculates a degree of similarity between the topic vector of the speaker text and each topic vector of the message (Step S304). The calculation unit 232 temporarily stores the calculated degree of similarity together with the corresponding message in the storage unit 22.

Then, the identification unit 233 of the interaction server 20 identifies at least one message that satisfies a predetermined criterion regarding the degree of relevance (for example, degree of similarity) from among the plurality of messages as a message to be presented to the speaker at a predetermined timing (Step S305). For example, at the timing when the scenario between the speaker and the AI assistant ends, the identification unit 233 identifies a message having the maximum degree of similarity among the plurality of messages stored in the storage unit 22 together with the degree of similarities as a message to be presented to the speaker.

Returning to FIG. 6, the interaction server 20 performs processing related to presentation of the identified message to the speaker. For example, the interactive processing unit 234 (presentation processing unit) of the interaction server 20 performs processing related to presentation of the message to the speaker by the AI assistant. More specifically, the interactive processing unit 234 generates assistant data on the basis of the identified message, and transmits the generated assistant data to the terminal device $30_1$ (Step S113).

The terminal device $30_1$ operates the AI assistant on the basis of the assistant data. This causes the identified message to be read by the AI assistant. That is, as described with reference to FIG. 7, the identified message is processed as an utterance text.

Figure 14:
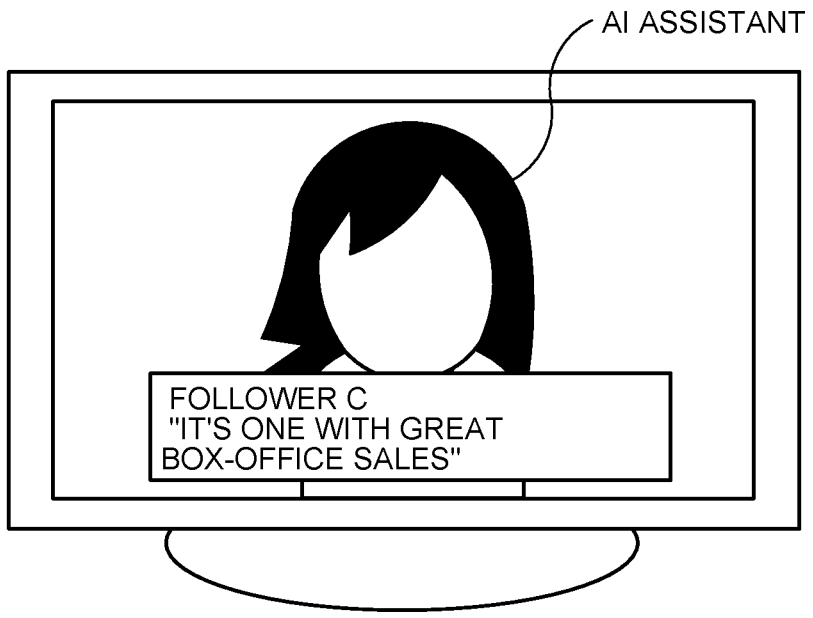
FIG. 14 is a diagram illustrating a state in which an identified message is read by an AI assistant.

FIG. 14 is a diagram illustrating how the identified message is read by the AI assistant. The display displays the name of the follower that transmitted the identified message and the identified message. Simultaneously with this display, the identified message is read by the AI assistant. These presentation processes are performed by the avatar motion data and the screen presentation command generated by the interaction server 20.

According to the present embodiment, since the speaker can confirm an appropriate message from the follower without missing it, the live distribution is excited. Furthermore, since the speaker can confirm the appropriate message from the follower without missing it, the follower can also feel as if he/she is participating in the conversation.

4. MODIFIED EXAMPLE

The above-described embodiments are examples, and various modifications and applications are possible.

4-1. Application to Panel Discussion

In the above-described embodiment, online live distribution has been described. However, the present technique can also be applied to conversations, conferences, and the like in a real space such as a "panel discussion".

Figure 15:
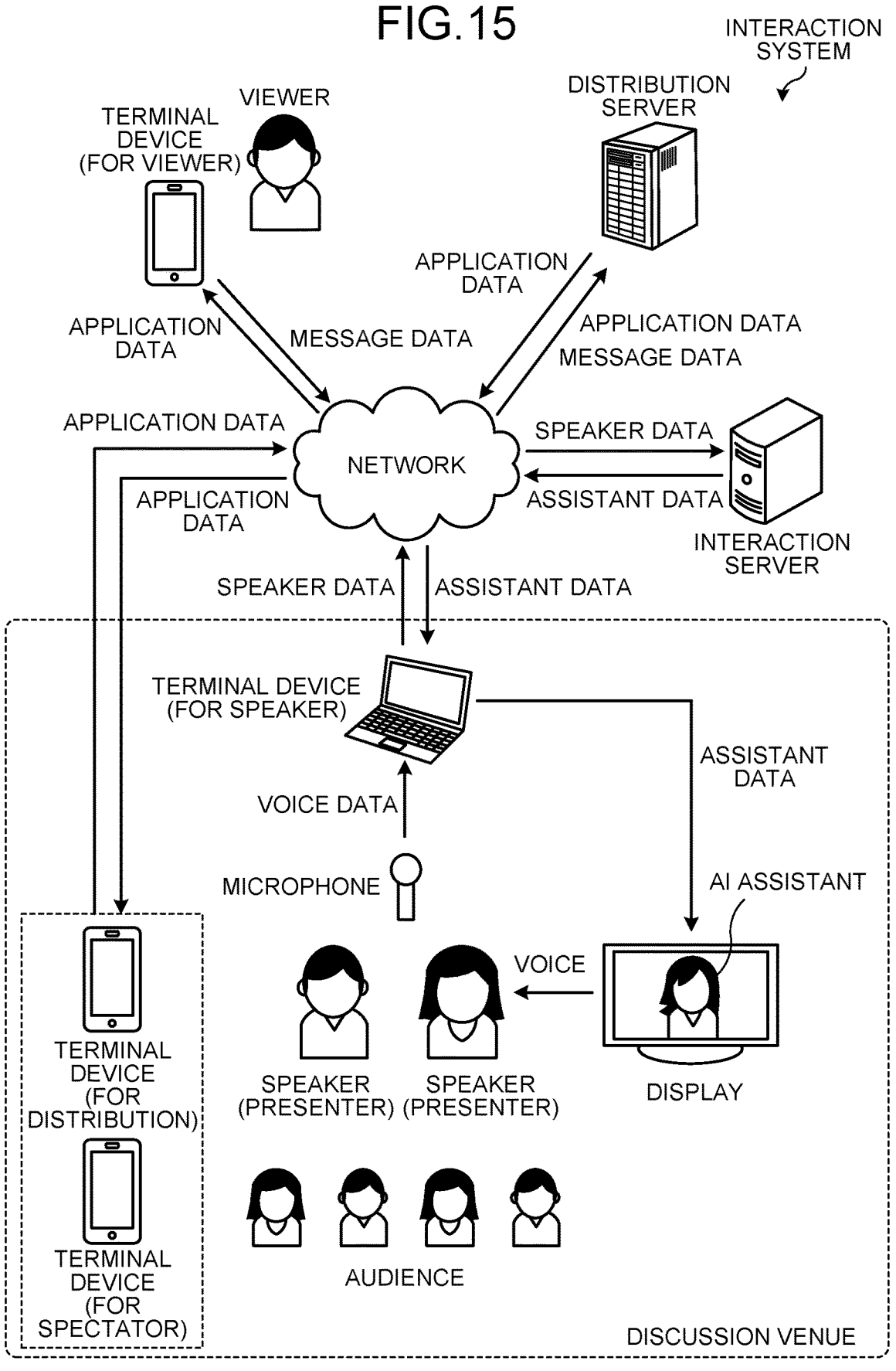
FIG. 15 is a configuration diagram in a case where the present technique is applied to a panel discussion.

FIG. 15 is a configuration diagram in a case where the present technique is applied to a panel discussion. In the present application example, a terminal device (for distribution), a terminal device (for speaker), a terminal device (for spectator), a terminal device (for viewer), an interaction server, and a distribution server are connected to a network. In a discussion venue, a plurality of presenters perform panel discussions. In this example, the presenter is a speaker. This state is distributed by a terminal device (for distribution). In the discussion venue, there are a plurality of spectators, and they are watching how the presenters discuss. Each of the spectators possesses the terminal device (for spectator) and is receiving the distribution of the discussion. The distribution of this discussion can be viewed outside the discussion venue. The viewer is watching the discussion using the terminal device (for viewer).

The voice of the person on the platform is acquired by the microphone and transmitted to the interaction server by the terminal device (for distribution). The interaction server can cause the AI assistant to execute a predetermined utterance such as a scenario when the panel discussion becomes a certain topic.

The viewer and the spectator can transmit a message to the terminal device (for speaker) by means of a distribution application in the terminal device (for viewer) and the terminal device (for spectator). However, the presenter in the discussion has no time to read the message from the viewer. In the prior art, in order to confirm the message, there is no choice but to employ a human assistant or the presenters suspending the discussion to confirm the message.

Using the present technique, the AI assistant reads out a message along the topic being discussed, so that the presenters do not miss the message. Furthermore, the viewer and the spectator can also be conscious of participating in the discussion.

Figure 16:
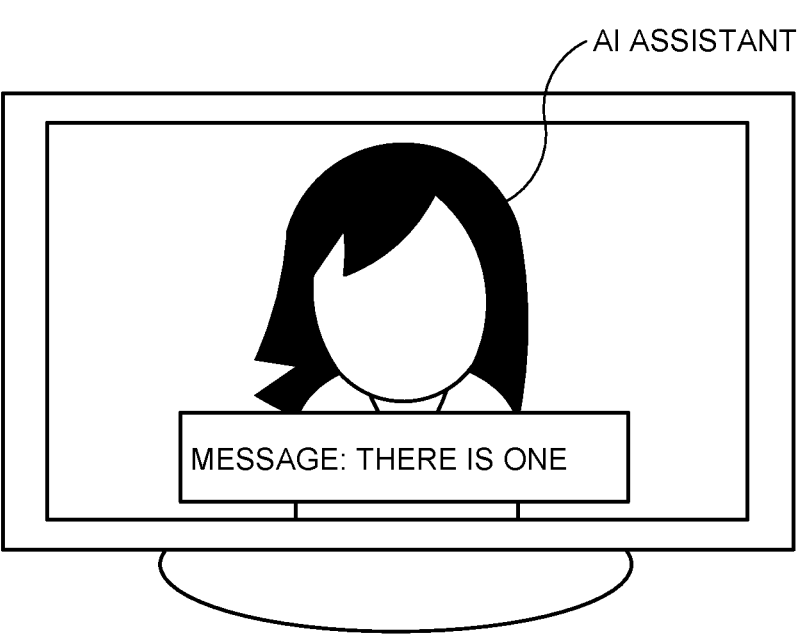
FIG. 16 is a diagram illustrating a state in which an identified message is read by an AI assistant.

FIG. 16 is a diagram illustrating how the identified message is read by the AI assistant. Since it is problematic that the AI assistant interrupts during the discussion, it is also conceivable to display a telop of "there is a message" as illustrated in FIG. 16 in a case where there is a message from the viewer. In this case, when the break of the panel discussion is good, the presenter may allow the AI assistant to utter the message.

4-2. Modified Example Regarding Calculation of Degree of Relevance

In the above-described embodiment, the interaction server 20 calculates the degree of relevance (degree of similarity) between the utterance of the speaker and the message using the topic analysis, but the method of calculating the degree of relevance between the utterance of the speaker and the message is not limited thereto. The degree of relevance (degree of similarity) may be calculated using term frequency-inverse document frequency (TF-IDF). For example, the interaction server 20 obtains a vector of the TF-IDF of a word constituting a scenario. Then, the interaction server 20 obtains an inner product of the word constituting a message and the vector of the IF-IDF, and determines whether the topics match at a certain threshold or more.

4-3. Modified Example Regarding Identification of Message

Furthermore, in the above-described embodiment, the interaction server 20 identifies the message having the highest degree of relevance from the plurality of messages as a message related to the presentation to the speaker. However, the method of identifying the message is not limited thereto. For example, the interaction server 20 may identify a predetermined number of messages from the plurality of messages in descending order of the degree of relevance as messages related to presentation to the speaker.

4-4. Other Modified Examples

The control device that controls the distribution server 10, the interaction server 20, or the terminal device 30 of the present embodiment may be realized by a dedicated computer system or a general-purpose computer system.

For example, a communication program for executing the above-described operation is stored and distributed in a computer-readable recording medium such as an optical disk, a semiconductor memory, a magnetic tape, or a flexible disk. Then, for example, the program is installed in a computer, and the above-described processing is executed to configure the control device. At this time, the control device may be a device (for example, a personal computer) outside the distribution server 10, the interaction server 20, or the terminal device 30. Furthermore, the control device may be a device (for example, the control unit 13, the control unit 23, or the control unit 33) inside the distribution server 10, the interaction server 20, or the terminal device 30.

Furthermore, the communication program may be stored in a disk device included in a server device on a network such as the Internet so that the communication program can be downloaded to a computer. Furthermore, the above-described functions may be realized by cooperation of an operating system (OS) and application software. In this case, a portion other than the OS may be stored in a medium and distributed, or a portion other than the OS may be stored in a server device and downloaded to a computer.

Furthermore, among the processing described in the above embodiments, all or a part of the processing described as being performed automatically can be performed manually, or all or a part of the processing described as being performed manually can be performed automatically by a known method. In addition, the processing procedure, specific name, and information including various data and parameters illustrated in the document and the drawings can be arbitrarily changed unless otherwise specified. For example, the various types of information illustrated in each drawing are not limited to the illustrated information.

Furthermore, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in an arbitrary unit according to various loads, usage conditions, and the like. Note that this configuration by distribution and integration may be performed dynamically.

Furthermore, the above-described embodiments can be appropriately combined in a region in which the processing contents do not contradict each other. Furthermore, the order of each step illustrated in the flowchart of the above-described embodiment can be appropriately changed.

Furthermore, for example, the present embodiment can be implemented as any configuration constituting an apparatus or a system, for example, a processor as a system large scale integration (LSI) or the like, a module using a plurality of processors or the like, a unit using a plurality of modules or the like, a set obtained by further adding other functions to a unit, or the like (that is, a configuration of a part of the device).

Note that, in the present embodiments, the system means a set of a plurality of components (devices, modules (parts), etc.), and it does not matter whether or not all the components are in the same housing. Therefore, a plurality of devices housed in separate housings and connected via a network, and one device in which a plurality of modules is housed in one housing are both systems.

Furthermore, for example, the present embodiments can adopt a configuration of cloud computing in which one function is shared and processed by a plurality of devices in cooperation via a network.

5. CONCLUSION

As described above, according to an embodiment of the present disclosure, the interaction server 20 acquires a plurality of messages with respect to the utterance of the speaker, and calculates the degree of relevance between the utterance and each of the plurality of messages. Then, the interaction server 20 identifies at least one message satisfying a predetermined criterion regarding the degree of relevance from among the plurality of messages, and performs processing regarding presentation of the identified message to the speaker. As a result, the speaker can check the appropriate message from the follower without missing it, so that the live distribution is excited.

Although the embodiments of the present disclosure have been described above, the technical scope of the present disclosure is not limited to the above-described embodiments as it is, and various modifications can be made without departing from the gist of the present disclosure. Furthermore, components of different embodiments and modified examples may be appropriately combined.

Furthermore, the effects of each embodiment described in the present specification are merely examples and are not limited, and other effects may be provided.

Note that the present technique can also have the following configurations.

(1)

An information processing apparatus comprising:

an acquisition unit that acquires a plurality of messages in response to an utterance of a speaker;

a calculation unit that calculates a degree of relevance between the utterance and each of the plurality of messages;

an identification unit that identifies at least one message that satisfies a predetermined criterion regarding the degree of relevance among the plurality of messages; and a presentation processing unit that performs processing related to presentation of the identified message to the speaker.

(2)

The information processing apparatus according to (1), wherein the presentation processing unit performs processing related to presentation of the message to the speaker by a virtual character interacting with the speaker.

(3)

The information processing apparatus according to (2), wherein an operation of the virtual character is processed by a terminal device, and the presentation processing unit transmits data related to the operation of the virtual character including the identified message to the terminal device.

(4)

The information processing apparatus according to any one of (1) to (3), wherein the identification unit identifies a message having a highest degree of relevance from the plurality of messages.

(5)

The information processing apparatus according to any one of (1) to (3), wherein the identification unit identifies a predetermined number of messages from the plurality of messages in descending order of the degree of relevance.

(6)

The information processing apparatus according to any one of (1) to (5), wherein the calculation unit calculates the degree of relevance between the utterance and the message based on a first topic vector including a degree of similarity between the utterance and each of a plurality of topics and a second topic vector including a degree of similarity between the message and each of the plurality of topics.

(7)

The information processing apparatus according to any one of (1) to (6), wherein the utterance of the speaker is distributed via a network, and the acquisition unit acquires the plurality of messages transmitted from the one or plurality of audiences via the network.

(8)

An information processing method comprising:

acquiring a plurality of messages in response to an utterance of a speaker;

calculating a degree of relevance between the utterance and each of the plurality of messages;

identifying at least one message that satisfies a predetermined criterion regarding the degree of relevance among the plurality of messages; and performing processing related to presentation of the identified message to the speaker.

(9)

A program for causing a computer to function as:

an acquisition unit that acquires a plurality of messages in response to an utterance of a speaker;

a calculation unit that calculates a degree of relevance between the utterance and each of the plurality of messages;

an identification unit that identifies at least one message that satisfies a predetermined criterion regarding the degree of relevance among the plurality of messages; and a presentation processing unit that performs processing related to presentation of the identified message to the speaker.

REFERENCE SIGNS LIST

1 INTERACTION SYSTEM
10 DISTRIBUTION SERVER
20 INTERACTION SERVER
30 TERMINAL DEVICE
11, 21, 31 COMMUNICATION UNIT
12, 22, 32 STORAGE UNIT
13, 23, 33 CONTROL UNIT
34 INPUT UNIT
35 OUTPUT UNIT
36 IMAGING UNIT
231 ACQUISITION UNIT
232 CALCULATION UNIT
233 IDENTIFICATION UNIT
234 INTERACTIVE PROCESSING UNIT
235 VOICE RECOGNITION UNIT
N NETWORK

The invention claimed is:

1. An information processing apparatus, comprising:

an acquisition unit configured to:

acquire speaker data of a speaker, wherein the speaker data includes an utterance of the speaker; and acquire, from a plurality of audiences, a plurality of messages based on the utterance of the speaker;

a calculation unit configured to calculate a plurality of degrees of relevance, wherein each of the plurality of degrees of relevance is between the utterance of the speaker and a respective message of the plurality of messages from the plurality of audiences, and the each of the plurality of degrees of relevance corresponds to a degree of similarity between utterance of the speaker and the respective message;

an identification unit configured to identify, based on the each of the plurality of degrees of relevance, a specific message of the plurality of messages, wherein the specific message satisfies a specific criterion regarding the each of the plurality of degrees of relevance; and a presentation processing unit configured to perform a presentation process of the specific message, wherein the presentation process is associated with the speaker.

2. The information processing apparatus according to claim 1, wherein the presentation processing unit is further configured to perform the presentation process based on an interaction of a virtual character with the speaker.

3. The information processing apparatus according to claim 2, wherein the speaker is associated with a terminal device, the terminal device processes an operation of the virtual character, the presentation processing unit is further configured to transmit, to the terminal device, data associated with the operation of the virtual character, and the transmitted data includes the specific message.

4. The information processing apparatus according to claim 1, wherein the specific message is associated with a highest degree of relevance from the plurality of degrees of relevance.

5. The information processing apparatus according to claim 1, wherein the identification unit is further configured to identify a set of messages from the plurality of messages, the set of messages is associated with a set of degrees of relevance of the plurality of degrees of relevance, the identification of the set of messages is in a descending order, and the descending order is associated with the set of degrees of relevance.

6. The information processing apparatus according to claim 1, wherein the calculation unit is further configured to calculate the each of the plurality of degrees of relevance between the utterance of the speaker and the respective message based on a first topic vector that includes a degree of similarity between the utterance and each of a plurality of topics, and a second topic vector that includes a degree of similarity between the respective message and the each of the plurality of topics.

7. The information processing apparatus according to claim 1, wherein distribution of the utterance of the speaker is via a network, the plurality of audiences transmits the plurality of messages via the network, and the acquisition unit is further configured to acquire the transmitted plurality of messages.

8. An information processing method, comprising:

acquiring speaker data of a speaker, wherein the speaker data includes an utterance of the speaker;

acquiring, from a plurality of audiences, a plurality of messages based on the utterance of the speaker;

calculating a plurality of degrees of relevance, wherein each of the plurality of degrees of relevance is between the utterance of the speaker and a respective message of the plurality of messages from the plurality of audiences, and the each of the plurality of degrees of relevance corresponds to a degree of similarity between utterance of the speaker and the respective message;

identifying, based on the each of the plurality of degrees of relevance, a specific message of the plurality of messages, wherein the specific message satisfies a specific criterion regarding the each of the plurality of degrees of relevance; and performing a presentation process of the specific message, wherein the presentation process is associated with the speaker.

9. A non-transitory computer-readable medium having stored thereon, computer executable instructions which, when executed by a computer, cause the computer to execute operations, the operations comprising:

acquiring speaker data of a speaker, wherein the speaker data includes an utterance of the speaker;

acquiring, from a plurality of audiences, a plurality of messages based on the utterance of the speaker;

calculating a plurality of degrees of relevance, wherein each of the plurality of degrees of relevance is between the utterance of the speaker and a respective message of the plurality of messages from the plurality of audiences, and the each of the plurality of degrees of relevance corresponds to a degree of similarity between utterance of the speaker and the respective message;

identifying, based on the each of the plurality of degrees of relevance, a specific message of the plurality of messages, wherein the specific message satisfies a specific criterion regarding the each of the plurality of degrees of relevance; and performing a presentation process of the specific message, wherein the presentation process is associated with the speaker.

* * * * *